United States Patent [19]
Chang et al.

[11] Patent Number: 5,785,909
[45] Date of Patent: Jul. 28, 1998

[54] METHOD OF MAKING FOOTWEAR WITH A POURABLE FOAM

[75] Inventors: Dong Fong Chang, Taichung, Taiwan; Jeffrey L. Johnson; Ross A. McLaughlin, both of Lake Oswego, Oreg.; Toren P.B. Orzeck, Portland, Oreg.; Donald M. Remlinger, Lantau Island, Hong Kong; David L. Vattes, Beaverton, Oreg.

[73] Assignee: Nike, Inc., Beaverton, Oreg.

[21] Appl. No.: 701,159

[22] Filed: Aug. 21, 1996

[51] Int. Cl.⁶ .................. B29C 44/06; B29C 44/12
[52] U.S. Cl. .................. 264/46.5; 264/46.6; 264/161; 264/244
[58] Field of Search .................. 264/46.5, 46.6, 264/244, 161; 425/119

[56] References Cited

U.S. PATENT DOCUMENTS

| | | |
|---|---|---|
| 1,955,720 | 4/1934 | Rollmann .................. 264/46.5 |
| 2,694,871 | 11/1954 | Rollman .................. 264/46.5 |
| 2,880,467 | 4/1959 | Wibbens .................. 264/46.6 |
| 2,907,074 | 10/1959 | Rhodes .................. 264/46.6 |
| 2,974,373 | 3/1961 | Streed et al. .................. 264/46.6 |
| 3,009,204 | 11/1961 | Bingham, Jr. et al. . |
| 3,016,569 | 1/1962 | Bingham, Jr. et al. . |
| 3,170,178 | 2/1965 | Scholl . |
| 3,225,388 | 12/1965 | Hansjosten .................. 264/46.5 |
| 3,269,037 | 8/1966 | Massicotte . |
| 3,355,535 | 11/1967 | Hain et al. . |
| 3,362,091 | 1/1968 | Drago . |
| 3,416,174 | 12/1968 | Novitske . |
| 3,421,183 | 1/1969 | Grimmeisen . |
| 3,439,384 | 4/1969 | Crossen et al. . |
| 3,541,646 | 11/1970 | Baudou . |
| 3,596,318 | 8/1971 | Kyritsis et al. . |
| 3,641,688 | 2/1972 | von den Benken . |
| 3,659,996 | 5/1972 | Schwartz et al. . |
| 3,684,420 | 8/1972 | Barker . |
| 3,766,669 | 10/1973 | Pearsall . |
| 3,769,392 | 10/1973 | Tessaro .................. 264/46.5 |
| 3,823,493 | 7/1974 | Brehm et al. . |
| 3,846,533 | 11/1974 | Carrier . |
| 3,896,202 | 7/1975 | Palua . |
| 3,897,528 | 7/1975 | Suh . |
| 3,913,160 | 10/1975 | Funck . |
| 3,921,313 | 11/1975 | Mahide et al. . |
| 3,966,381 | 6/1976 | Suh . |
| 3,983,204 | 9/1976 | Opinsky et al. . |
| 3,988,797 | 11/1976 | Tornero . |
| 4,150,455 | 4/1979 | Fukuoka . |
| 4,187,621 | 2/1980 | Cohen . |
| 4,245,406 | 1/1981 | Landay et al. . |
| 4,266,314 | 5/1981 | Londner espouse Ours . |

(List continued on next page.)

FOREIGN PATENT DOCUMENTS

| | | |
|---|---|---|
| 2063227 | 7/1971 | France . |
| 2 005 900 | 9/1970 | Germany .................. 264/244 |

*Primary Examiner*—Allan R. Kuhns
*Attorney, Agent, or Firm*—Banner & Witcoff, Ltd.

[57] ABSTRACT

A method of making an article of footwear includes the steps of constructing an upper having an inner surface material and an outer surface material which define an upper formation cavity, disposing the upper on a mold core, positioning the mold core and the upper in a base portion of a mold such that the upper formation cavity is accessible from above when the mold cavity is open, pouring a plastic foam material into the upper formation cavity of the upper, closing a top portion of the mold onto the base portion of the mold to thereby sealingly close the mold and the upper formation cavity, curing the plastic foam material within the upper formation cavity of the upper to form a molded article of footwear upper, and opening the top portion of the mold and removing the article of footwear upper. The preferred method of the present invention further includes, prior to the steps of pouring the foam and closing the top portion of the mold, positioning a preformed sole unit on the top portion of the mold, integrally joining the preformed sole unit with the molded article of footwear upper during the curing process of the foam material, and then removing the molded article of footwear from the mold.

19 Claims, 12 Drawing Sheets

U.S. PATENT DOCUMENTS

| | | |
|---|---|---|
| 4,418,483 | 12/1983 | Fujita et al. . |
| 4,581,187 | 4/1986 | Sullivan et al. . |
| 4,627,178 | 12/1986 | Sullivan et al. . |
| 4,651,444 | 3/1987 | Ours .................................... 264/244 |
| 4,666,782 | 5/1987 | Tada et al. . |
| 4,674,204 | 6/1987 | Sullivan et al. . |
| 4,694,589 | 9/1987 | Sullivan et al. . |
| 4,864,738 | 9/1989 | Horovitz . |
| 4,960,374 | 10/1990 | Proll . |
| 5,014,449 | 5/1991 | Richard et al. . |
| 5,015,427 | 5/1991 | Sosnow . |
| 5,106,445 | 4/1992 | Fukuoka . |
| 5,177,824 | 1/1993 | Ou . |
| 5,202,069 | 4/1993 | Pontiff . |

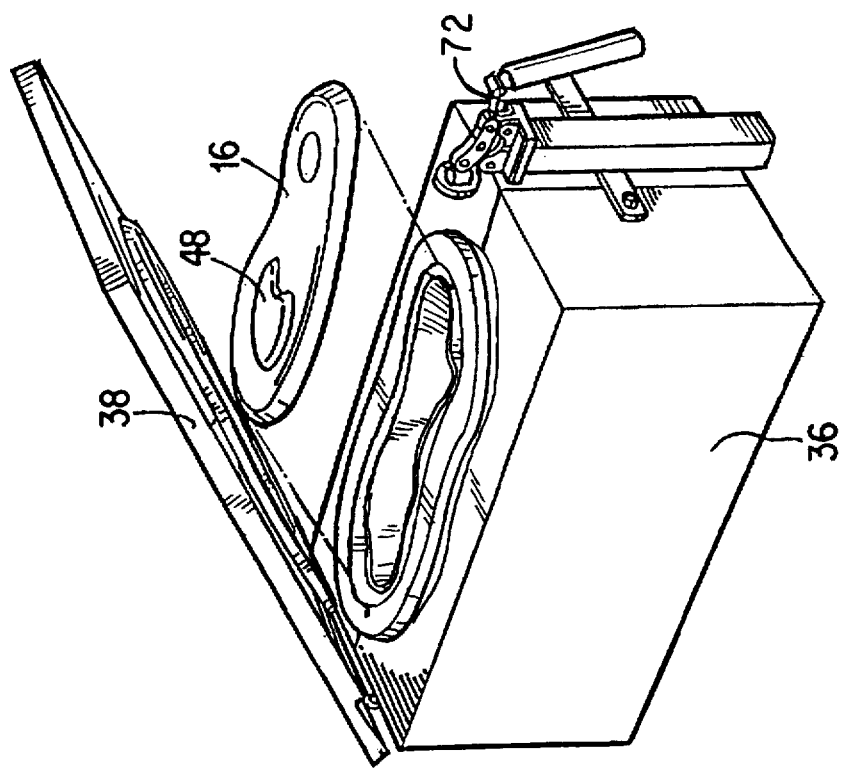
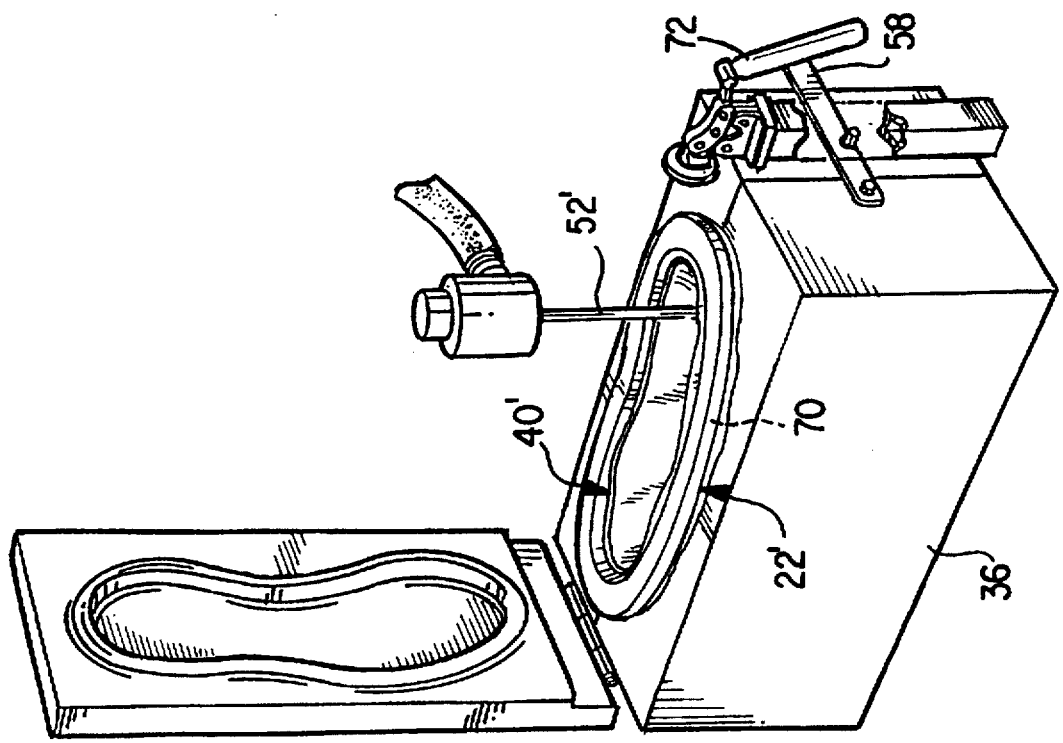

METHOD OF MAKING FOOTWEAR WITH A POURABLE FOAM

TECHNICAL FIELD

The present invention is directed to a method for manufacturing an article of footwear from a plastic foam, and in particular, for molding an article of footwear upper from a pourable plastic foam while simultaneously joining prefabricated sole components during the molding process.

BACKGROUND OF THE INVENTION

Numerous articles of footwear and methods for manufacturing the same are known in the prior art. The simplest of these constructions includes stitching together overlapping layers of leather or cloth to form an upper covering for the foot and then using an adhesive to attach a preformed outsole. The adhesive may be applied with a brush, or alternatively, as in U.S. Pat. No. 3,988,797 to Tornero, a shoe upper may be integrally joined to a preformed rubber outsole by placing both the shoe upper and outsole in a mold cavity and then injection molding an outsole adherent therein in order to join the outsole to the upper. Other constructions include forming an injection molded outsole and/or midsole and integrally joining the upper during the molding process of the sole unit. For example, U.S. Pat. No. 4,245,406 to Landay et al. discloses an athletic shoe in which an upper and a preformed rubber outsole are joined by a foamed poly-urethane, injection-molded midsole. The shoe is manufactured by treating the inner surface of a preformed rubber outsole to prepare it for bonding to polyurethane, inserting the treated sole into the bottom of a mold, mounting a preformed upper on a last, lowering the last and closing the mold, with the last spaced above the rubber outsole, injecting a charge of foamable polyurethane between the outsole and the last, and allowing the polyurethane to foam under self-generated pressure to form the midsole and to bond with the outsole and upper.

Each of the above constructions utilizes an injection molding process to form all or part of the sole unit or to adhere the sole to the preformed upper. Further methods of construction, such as those disclosed in U.S. Pat. No. 4,150,455 to Fukuoka and U.S. Pat. No. 4,266,314 to Londner epouse Ours, expand the use of injection molding to include the upper portion of the article of footwear. Fukuoka discloses an upper base in a mold and then injects a synthetic resin material for the upper into the upper molding cavity. After the upper portion of synthetic resin is cooled, the upper is transferred to the mold for the sole and the sole portion of synthetic resin is injected into the sole molding chamber. After the sole portion of synthetic resin is cooled, the finished molded shoe of synthetic resin is removed from the mold. Londner epouse Ours discloses a lining of leather or other suitable material for the shoe upper onto which are overmolded two overlapping portions of plastic materials of different types. The first layer of plastic material is injection molded in direct contact with the lining and covers the entire upper while the second injection molded portion constitutes a stiffening reinforcement that surrounds only the rear counter of the upper and a thin intermediate sole. An outer wearing sole is then added to the article of footwear. The injection molding processes utilized in the above prior art, whether to mold only the sole or portions of the upper as well, have the disadvantages of requiring an additional finishing step for attaching the upper of the article of footwear, leaving voids within the molded material and limiting the available foams to those which provide acceptable cosmetics, bonding strength and split tear resistance, no air bubbles, exposure to elements survival, whiteness/color retention. Flash control foams, such as DALTOPED and similar polyester and polyether based elastomer systems offered by ICI Americas Inc. or ARCO Chemical, were generally used.

SUMMARY OF THE INVENTION

The present invention overcomes these disadvantages by providing a method of making a finished article of footwear upper from a foam material. The method includes the steps of constructing an upper component having an inner surface material and an outer surface material which define an upper formation opening. The upper component is disposed on a mold core and positioned within a base portion of a mold cavity such that the upper formation opening is accessible from above when the mold cavity is open. A plastic foam material is poured into the upper formation opening of the upper component and a top portion of the mold cavity is then closed onto the base portion of the mold cavity to thereby sealingly close the mold. After a period of time, the plastic foam material cures within the upper formation opening of the upper component to form a molded article of footwear upper. Then, the top portion of the mold cavity is opened and the finished article of footwear upper is removed.

The present invention also includes positioning a preformed sole unit on the top portion of the mold cavity prior to closing the mold. Thus, curing the foam material within the upper formation opening integrally joins the preformed sole unit with the molded article of footwear upper. In a preferred embodiment, the sole unit is a midsole unit. In addition, when preformed midsole unit is positioned on the top portion of the mold, an inflated cushioning unit may also be positioned on top thereof and similarly integrally joined between the molded article of footwear upper and the preformed midsole. Alternatively, after the article of footwear upper is removed from the mold, a cushioning unit may be bonded to a bottom surface of the preformed midsole unit. An outsole is then bonded to the bottom surface of the preformed midsole unit to complete the sole for the molded article of footwear. Alternatively, the sole unit can be a single piece unit functioning both as a midsole, cushioning unit and a ground engaging surface.

Even before the molding process, the outer surface of the upper component is preferably finished with additional elements, such as stitching a plurality of overlapping layers of material on the outer surface of the upper component, overlapping at least one layer of material and at least one support member, providing decorative ornamentation, and/or providing the upper component with a closure system for the molded article of footwear. Thus, after the molding process is complete, the article of footwear is substantially complete.

The present invention also provides a molded article of footwear constructed in accordance with the present method. The molded article of footwear includes a molded upper having an inner surface material and an outer surface material which define an upper formation opening, a plastic foam material disposed in the upper formation opening between the inner and outer surface materials, a preformed sole unit disposed below the upper, and includes a ground engaging bottom surface. The molded upper includes integrally formed decorative ornamentation and an integrally formed closure system, and the plastic foam material integrally joins the preformed sole unit with the molded article of footwear upper. The decorative ornamentation of the molded upper may include a plurality of molded overlapping layers of material on the outer surface of the upper and/or at least one molded layer of material and at least one molded support member, and the integrally formed closure system may include molded lace apertures in said upper and/or lace loops attached to an upper component.

BRIEF DESCRIPTION OF THE DRAWINGS

The above description and other objects, advantages, and features of the present invention will be more fully understood and appreciated by reference to the specification and accompanying drawings, wherein:

FIG. 8(A)–8(H) are diagrammatic drawings illustrating the steps of the manufacturing process of the present invention;

DETAILED DESCRIPTION OF THE PREFERRED EMBODIMENTS

Figure 3:
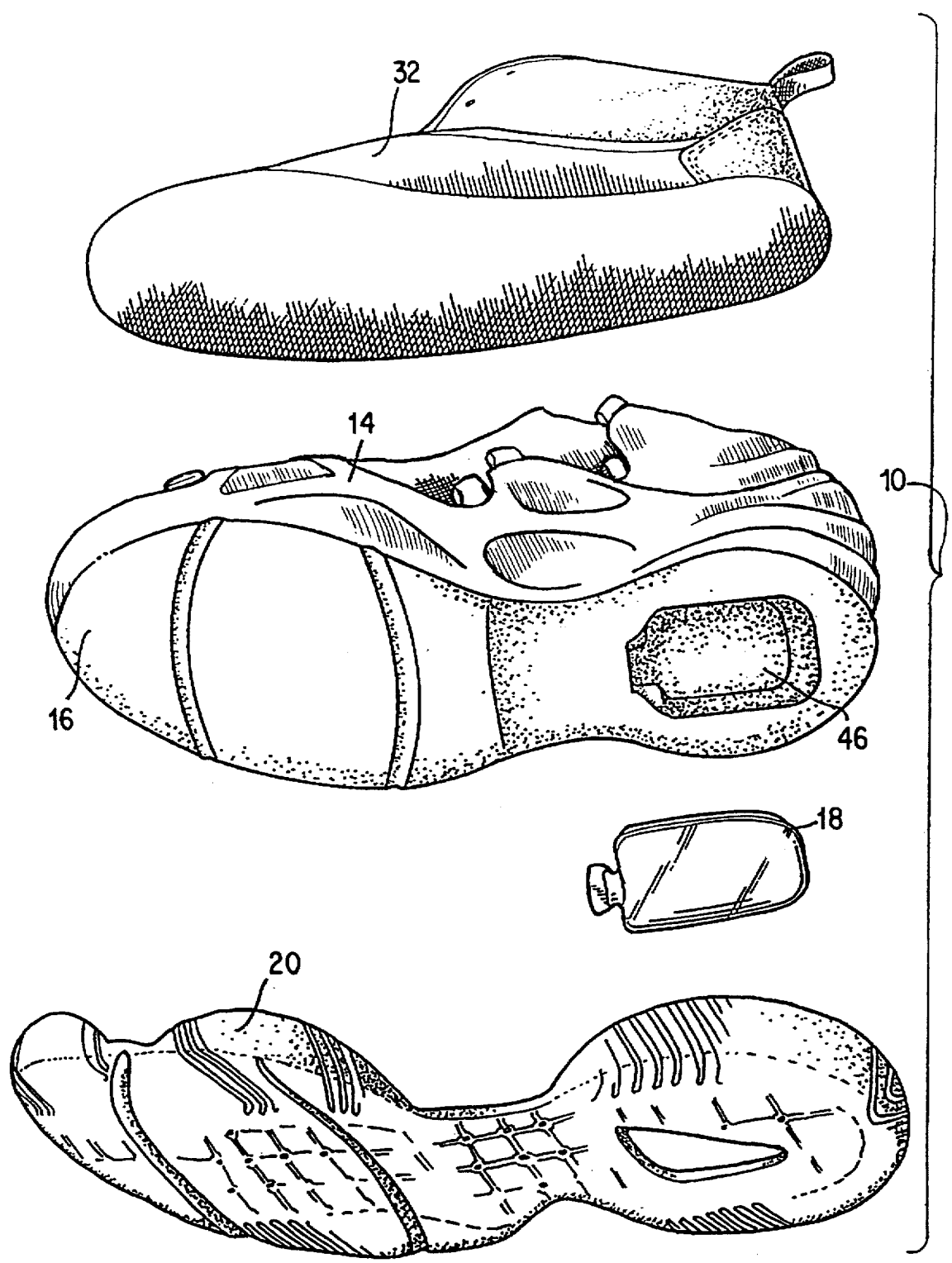
FIG. 3 is an exploded view of the first embodiment of an article of footwear manufactured according to the process of the present invention.
Figure 9:
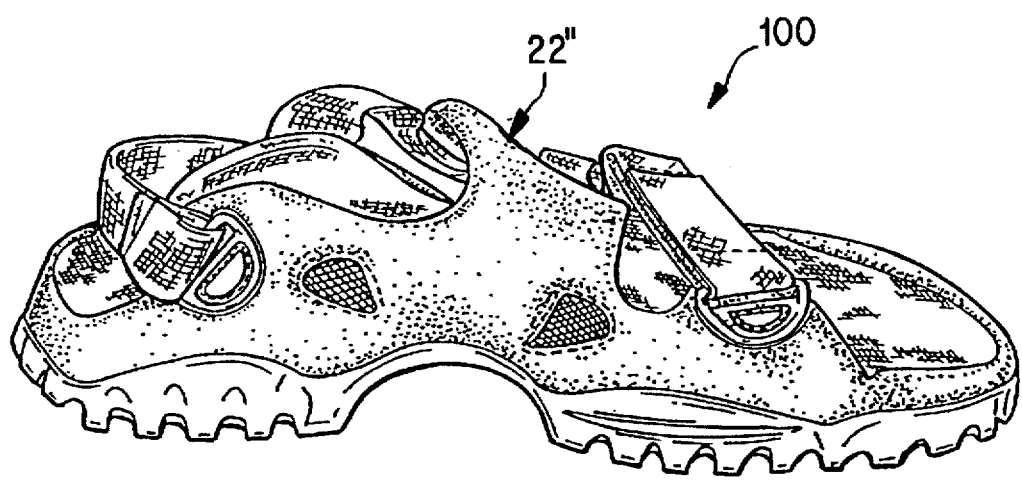
FIG. 9 is a perspective view of a further article of footwear manufactured in accordance with the process of the present invention.
Figure 11:
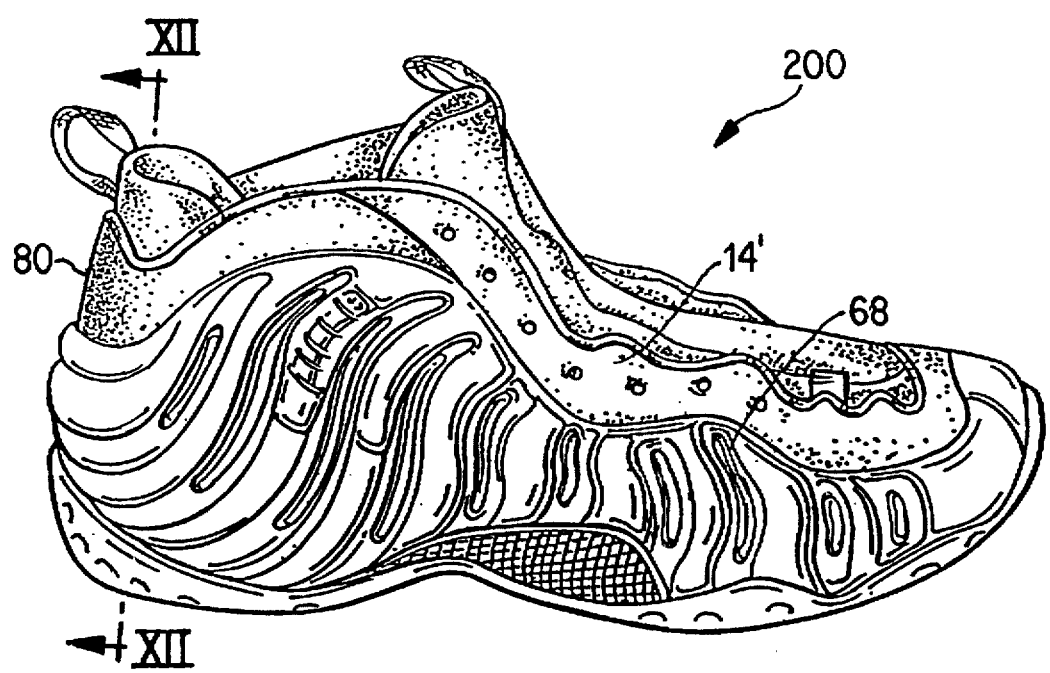
FIG. 11 is a perspective view of a further article of footwear manufactured in accordance with the process of the present invention.

An article of footwear manufactured in accordance with the process of the present invention is illustrated generally by reference numeral 10 for a first embodiment shown in FIG. 3, by reference numeral 100 for a second embodiment shown in FIG. 9, and by reference numeral 200 for a third preferred embodiment shown in FIG. 11. Although the following detailed description may refer in certain instances to one particular embodiment or another, it should be understood by one skilled in the art that a like description may also apply to each of the alternative embodiments.

Article of footwear 10 preferably includes a molded finished upper 14 a preformed midsole unit 16, an optional cushioning unit 18, and an outsole 20. Article of footwear 10 further includes an optional inner bootie 32. As discussed below in detail, the finished upper 14 is molded from foam and the preformed midsole unit 16 may be integrally joined during the molding process. Preformed midsole 16 may include an encapsulated cushioning unit 48 in the forefoot, heel, or the entire length thereof and additionally, preformed midsole 16 may include a preformed cavity 46 for receiving an additional cushioning unit 18. After removal from the mold, any additional cushioning units and the outsole may then be bonded to the bottom surface of the midsole 16.

Figure 8A:
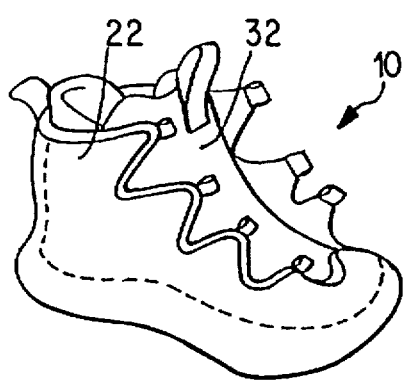
Figure 8B:
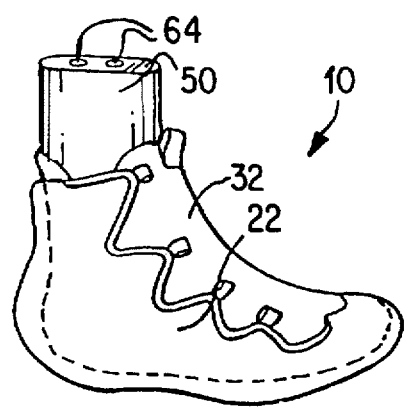

Referring to FIGS. 8(A)–8(H), the process in accordance with the present invention is illustrated in diagrammatic form. In FIG. 8(A), an upper component 22 and an inner bootie 32 are cut and sewn, complete with reinforcements and any decorative elements. As discussed in detail below, upper component 22 has an outer surface material 24 and an inner surface material 26 which are joined or stitched together at a top edge 28 to thereby form a cavity 40 therebetween. In FIG. 8(B), upper component 22 and bootie 32 are fit on to the mold core 50. FIGS. 8(A), 8(B), 8(G) and 8(H) generally illustrate article of footwear 10 shown in FIG. 3, however, it should be understood that article of footwear 200 and 100 are similarly formed by an upper component 22', 22", respectively, and placed on a mold core.

Figure 8C:
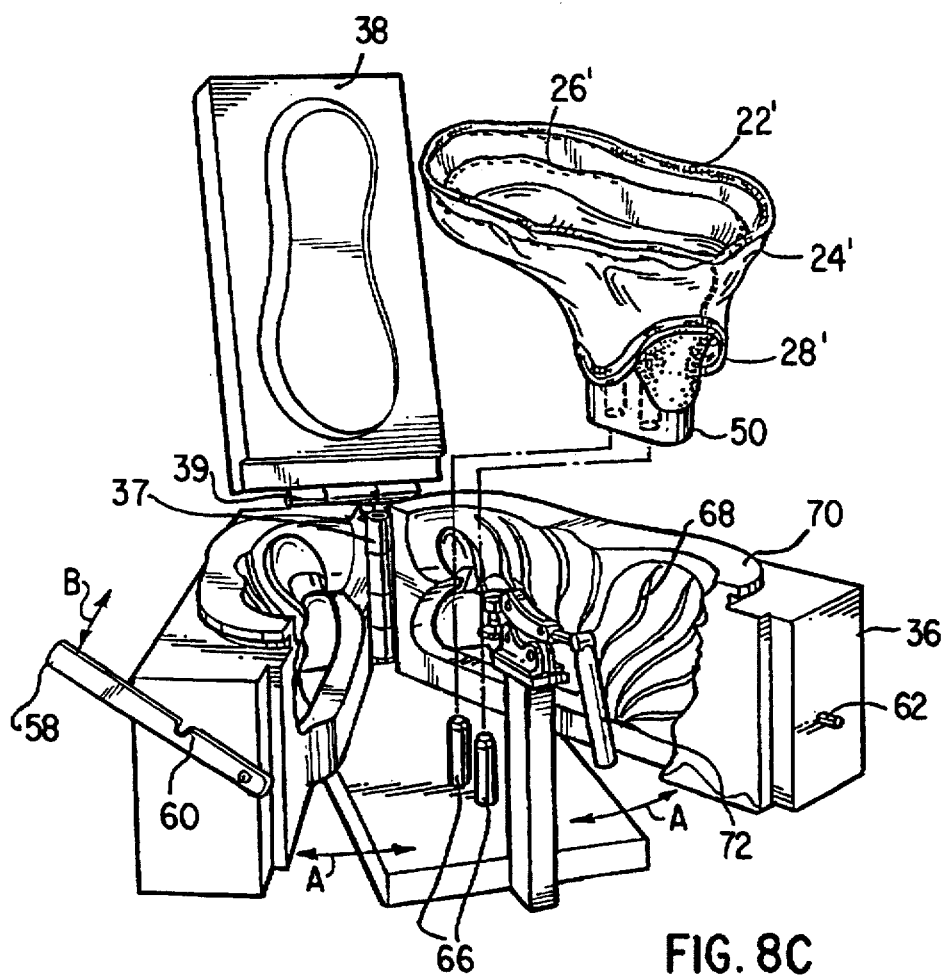

As shown in FIG. 8(C), mold core 50, with upper component 22' thereon, is disposed in a two-part mold base 36. The two side parts of mold base 36 are joined by a hinge 37 disposed along a vertical axis and are moved in the direction of arrow "A" to close the mold base. A pivoting locking arm 58 is pivoted in the direction of arrow "B" such that notch 60 engages locking pin 62 and thereby locks the mold base 36 in a closed position. Mold base 36 also includes a retaining lip 70 to secure the upper component within the mold, as discussed further below. The mold top 38 is joined to mold base 36 by a further hinge 39 disposed along a horizontal axis. Mold core 50 has a pair of spaced holes 64 that fit over a pair of pins 66 extending from the base of the mold assembly to position mold core 50 within the mold. For making article of footwear 200, the interior mold cavity shown in FIG. 8(C) includes a plurality of design elements 68, corresponding to the design elements shown in the finished article of footwear 200 of FIG. 11. As discussed in greater detail below, it should be clear that in the process of the present invention the mold cavity is unique to each article of footwear design.

Figure 8F:
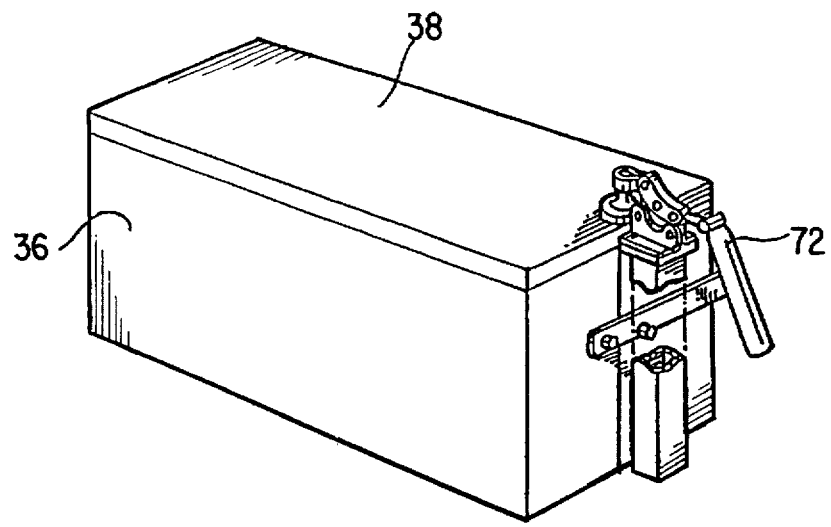

In FIG. 8(D), mold base 36 is hinged closed, fastened together by locking arm 58 and upper component 22' is secured within the mold by stretching the free edge thereof over retaining lip 70. In FIG. 8(E), preformed midsole 16 and inflated cushioning unit 48 are loaded into the mold and held by pins or any other type of temporary positioning mechanism. Preferably, after loading the midsole and cushioning unit, due to the time constraints involved when using foam, an exact metered amount of foam material 52' is then poured into cavity 40' of upper component 22' and mold top 38 is closed. Mold top 38 is pivotable about a horizontal axis located just above the vertical pivot axis of mold base 36. As shown in FIG. 8(F), mold top 38 is closed and fastened in place by a clamp 72. Mold top 38 remains clamped in a closed position until the foam has cured, approximately three to eight minutes, with currently available foam materials, such that foam material 52' reacts and fills cavity 40'. The reaction time will vary of course with the selection of foam material and it is foreseeable that foams will be developed requiring even a shorter period of time than that specified herein. After foam material 52' sets, clamp 72 is released, mold top 38 is pivoted about the hinge to an open position, and mold core 50 with molded upper 14' and midsole 16' are removed from the mold.

Figure 8G:
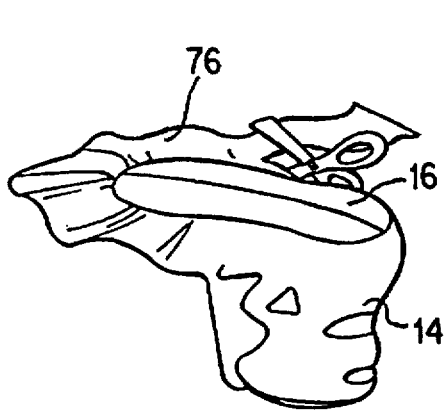
Figure 8H:
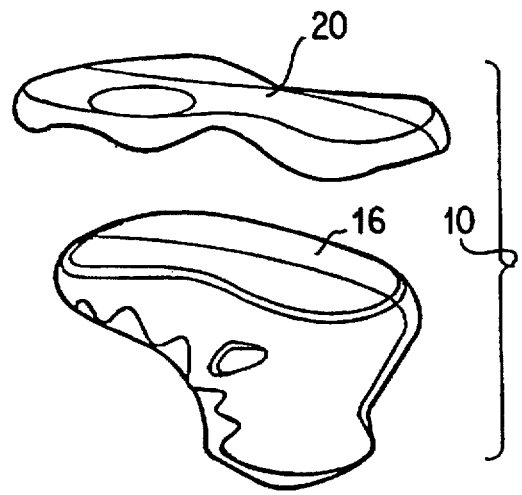

In FIG. 8(G), upper 14 and midsole 16, corresponding to article of footwear 10, are shown removed from the mold and with the excess material 76 being trimmed along the bottom of the upper. In FIG. 8(H), the outsole 20 is stock fit and adhesively attached to midsole 16 to form article of footwear 10, and thus, the process is complete. FIGS. 8(G) and (H) illustrate article of footwear 10, but it should be clear to one skilled in the art that article of footwear 100 and 200 are similarly trimmed after removal from the mold and fit with an outsole and/or other additional components to form the completed footwear.

Figure 1:
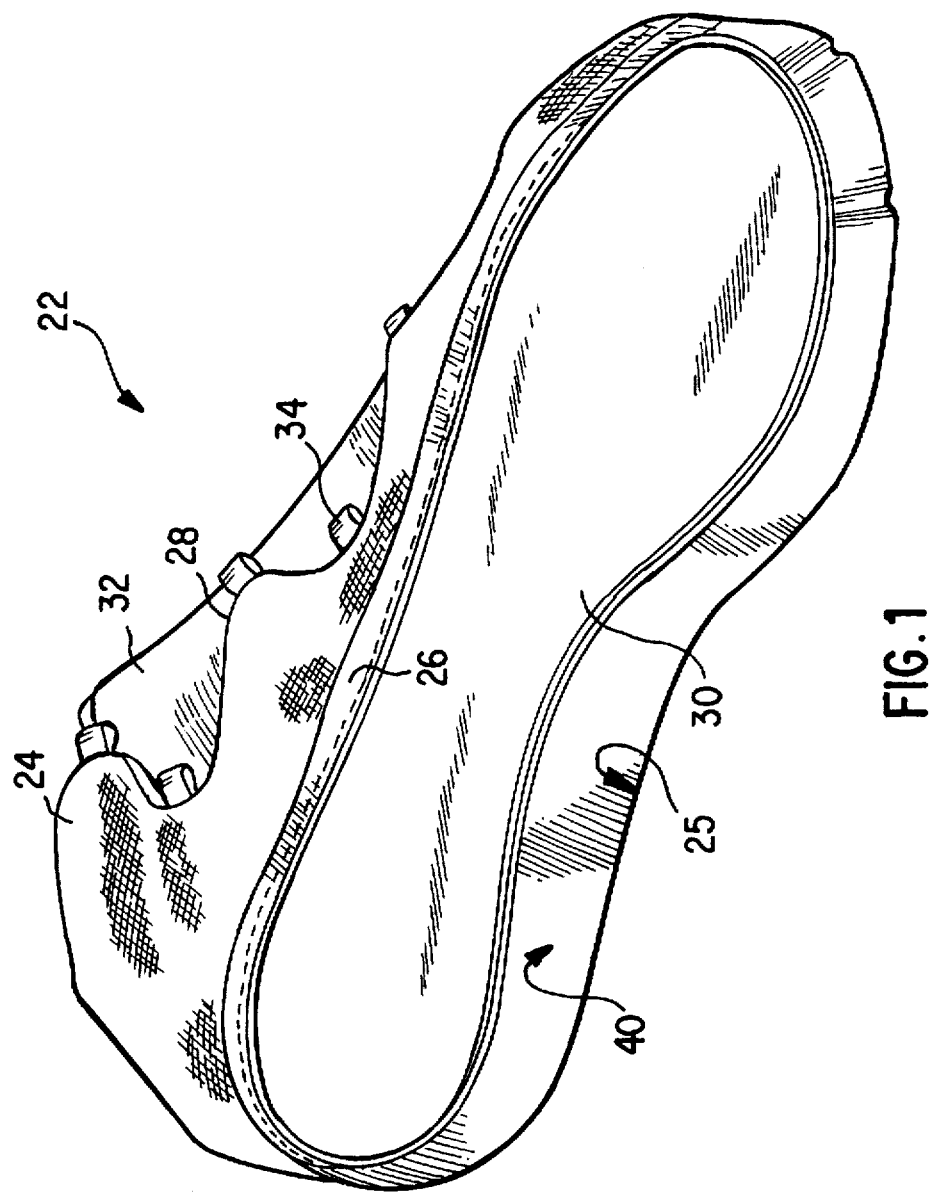
FIG. 1 is a bottom perspective view of a first embodiment of an upper component of an article of footwear in accordance with the present invention.
Figure 2:
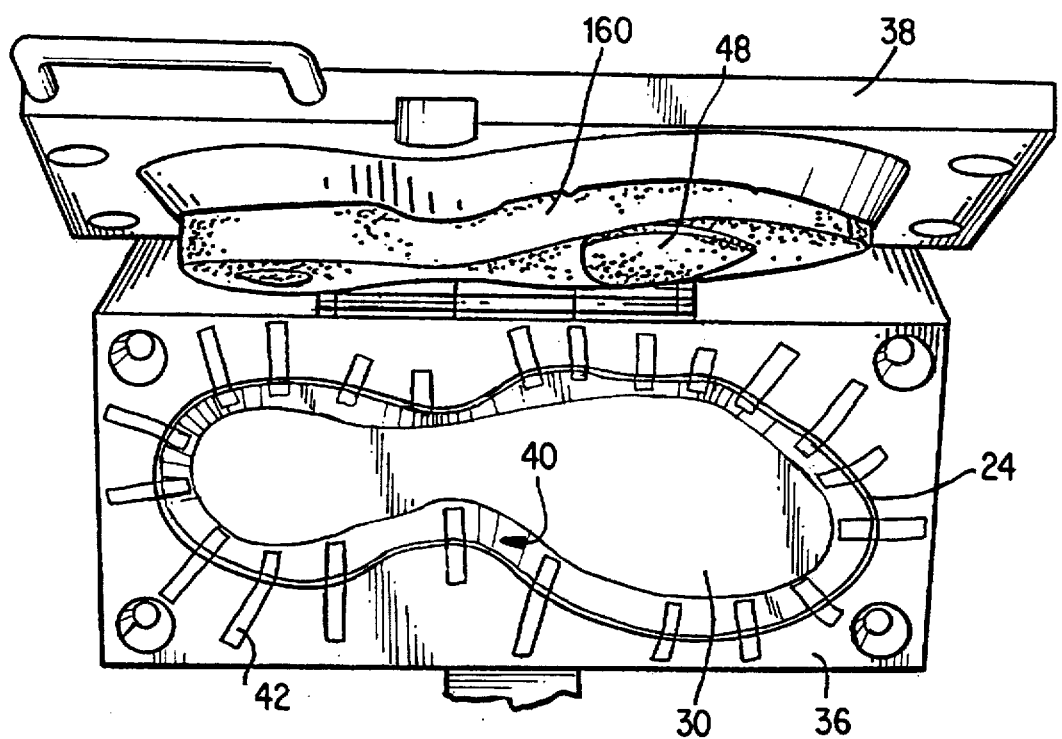
FIG. 2 is a perspective view of the bottom of the first embodiment of the upper component positioned within a mold for manufacturing an article of footwear in accordance with the process of the present invention.
Figure 4:
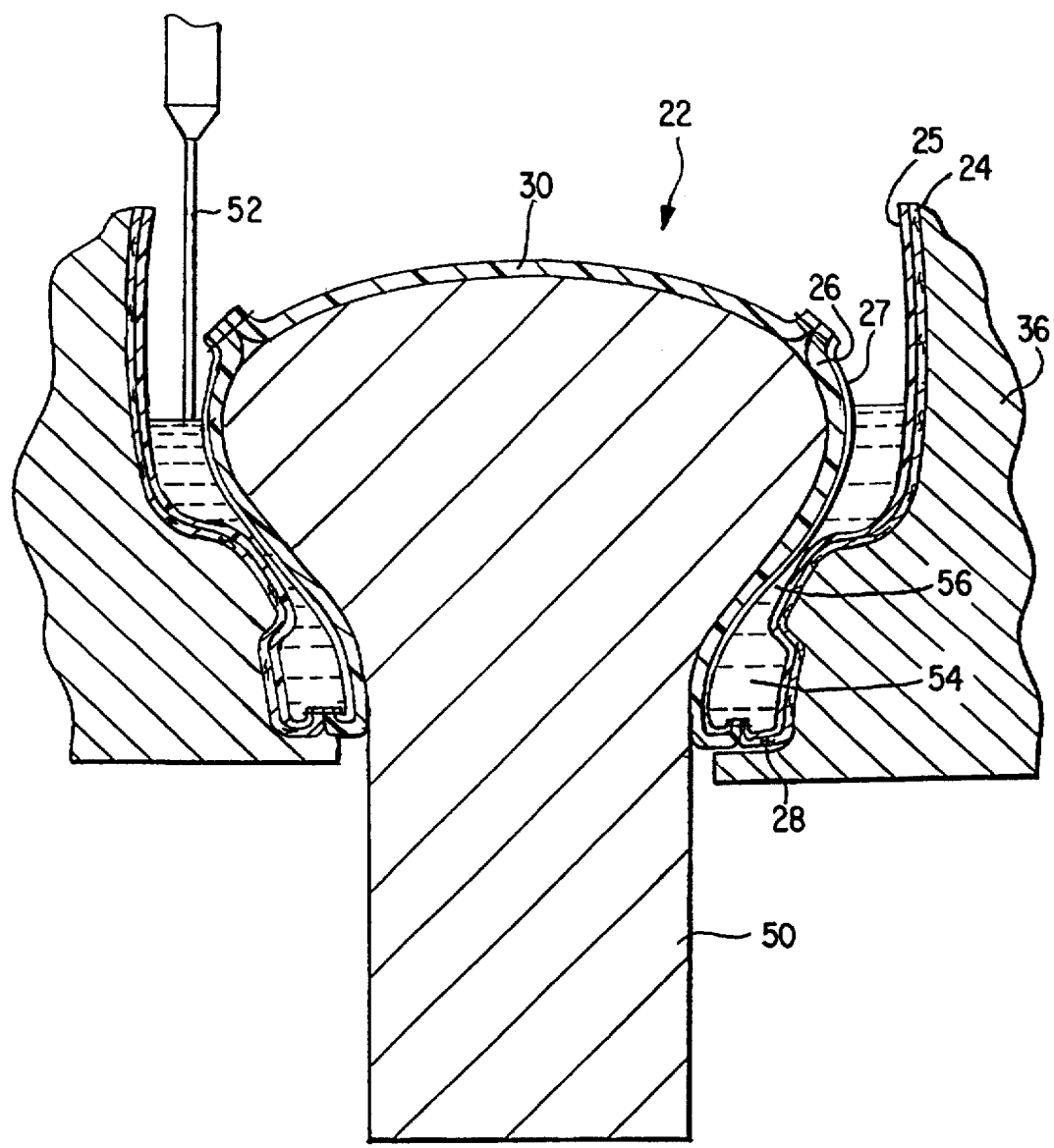
FIG. 4 is a diagrammatical view illustrating the pouring of foam material between the inner and outer surface materials of a second embodiment of an upper component in accordance with the process of the present invention.

Referring also to FIGS. 1, 2, and 4, the construction of molded upper 14 for article of footwear 10 is shown in detail. Upper 14 includes an upper component 22 having an outer surface material 24 and an inner surface material 26 which are joined or stitched together at a top edge 28 to thereby form a cavity 40 therebetween. As discussed above, cavity 40 is supplied with a foam material 52 during the molding process to fill in the void space and provide shape to the molded upper. The inner surface material 26 also includes a bottom surface material 30 attached thereto by stitching or other conventional attachment methods such that inner surface 26 and bottom surface 30 define the portion of the upper which will surround the foot in the final product. Molded upper 14 also may include an inner bootie 32 which may be either sewn to inner surface material 26 as shown in FIG. 1 or removably secured within the molded upper 14 as shown in FIG. 3. Upper component 22 and inner bootie 32 form a "glove" which surround the foot in the completed article of footwear.

The outer surface material 24 is preferably a material such as lycra, woven or nonwoven textiles, leather or synthetic leathers, or any other materials presently used in footwear, while inner surface material 26 is preferably a softer, more pliable and more comfortable material, such as DuraPlush®, a synthetic woven material, since inner surface 26 is in closer contact with the wearer. The interior of outer material surface 24 is further coated with a film layer 25 which will contact the foam material during the molding process. Similarly, the exterior of inner surface material 26 is coated with a film layer 27 which will also contact the foam material. Film layers 25, 27 are formed from a urethane adhesive and applied to the adjacent material by lamination to assist in the adhesion of the foam material as well as to form a barrier layer between the inner and outer surface materials and the foam material to prevent the foam material from "blowing" or passing through the inner and/or outer surface materials. If a nonpermeable or one way flow (e.g., gortex) material is used for the inner and/or outer surface material, then the film layer may be omitted thereon. Film layers 25, 27 are illustrated diagrammatically as thicker layers of material rather than typical thin laminates for purposes of illustration. If film layers 25, 27 are required solely to prevent the foam from passing through the material, the film layers may be placed on the outside of the material rather than on the inside if it is so desired.

Inner bootie 32 is preferably a four way stretch material such as lycra, nylon, and the like, so that it can securely and comfortably form a glove-like surrounding for the foot of the wearer. After the inner and outer surface materials 24 and 26 are cut and sewn together, along with bottom surface 30, additional elements such as decorative ornamentation, reinforcements and/or stiffeners may be added to the upper. Preferably, closure elements 34 such as the illustrated lace loops, a heel pull strap, and similar external additions as well as any desired overlapping decorative layers may be stitched or adhered to the exterior of upper component 22 prior to molding. Once the upper component 22 is completed, the component 22 and bootie 32 are fitted on to a last or mold core 50 for the molding process.

Referring to FIG. 2, in addition to FIGS. 8(3), and 8(C), mold core 50, with the upper component 22 thereover, is assembled within the mold base 36, illustrated as a one-piece base in FIG. 2, such that the bottom surface material 30 is facing the mold top 38. Upper component 22 is positioned or otherwise secured within the mold such that cavity 40 is positioned for receiving a foam material. Outer surface 24 may be secured using adhesive strips 42 as shown in FIG. 2, or more preferable, by being stretched or wrapped over retaining lip 70 as shown in FIGS. 8(C) and 8(D), or a ring or gasket of some type may be positioned around the exterior of the mold cavity to secure the component thereto. In the FIG. 2 embodiment, a single integral sole unit 160 having a midsole portion and an outsole portion is secured to the top of the mold. Once secured to the mold base, the upper component is ready for the foam material to be supplied. This is done by pouring a foam material 52, preferably a polyurethane foam having a cured density of approximately 0.2 g/cm$^3$, a hardness of preferably 30–35 Asker C, and a specific gravity of 0.2–0.4, into the cavity 40 between the inner surface material 26 and the outer surface material 24. When the cavity 40 is sufficiently filled, the pouring of the foam is discontinued. The amount of liquid foam to be poured depends upon the upper design, the desired hardness and the foam parameters of the particular foam selected and must therefore be calculated for each size of upper volume to be produced. An increased hardness value, for instance 60 Asker C or more, may be desired for certain types of footwear such as hiking boots and the specific gravity and thus the blowing pressure of the foam may need to adjusted accordingly in order to obtain the desired fill characteristics. For example, the mold is filled with approximately 50–200 grams of foam for an average men's size 9 shoe. The viscosity of the foam used in the present invention must also allow the foam to flow through to the smaller areas of the shoe upper, and should be generally between 340 and 880 cps at 25° C. and 120 and 420 cps at 40° C. The preferred polyurethane system includes isocynate and polyol. Other foam materials which may be used in the present invention include polyether systems supplied by ARCO Chemical or ICI Americas, Inc., as well as other urethanes that are pourable such as polyester polyurethane.

The preformed midsole unit 16 and any encapsulated cushioning units 48 are disposed on the mold top 38 prior to closing the top onto the base. The midsole 16 may also be positioned on the mold top 38 prior to pouring the foam material. In either case, with the midsole 16 disposed on the mold top 38 and the foam material filling the opening 40 between the surfaces of the upper component, the mold is closed for approximately three to eight minutes to allow the foam material to react, expand and harden within the upper component. In so doing, the foam material forms a molded shoe upper and integrally joins the preformed midsole and any cushioning units to the molded upper. At some point in the process, the mold may also be heated using conventional technology to approximately 120°–140° F. to further enhance the curing of the foam. Midsole unit 16 is preferably formed from phylon, EVA, polyolefin, elastomers, polyurethane, or any other suitable material.

Cushioning units 48 may include conventional inflated bladders manufactured using known techniques such as those described in U.S. Pat. Nos. 4,183,156 and 4,219,945, the entire contents of which are hereby incorporated by reference, or any other type of cushioning device. In a preferred embodiment, cushioning device 48 is formed from a thermoplastic elastomer foam such as polyester polyurethane, polyether polyurethane or the additional suitable materials identified in the '156 and '945 patents. Among the numerous thermoplastic urethanes which are particularly useful in forming the cushioning device are urethanes such as Peflethane™, (a trademarked product of the Dow Chemical Company of Midland, Mich.), Elastollan® (a registered trademark of the BASF Corporation) and ESTANE® (a registered trademark of the B.F. Goodrich Co.), all of which are either ester or ether based, and have proven to be particularly useful. Still other thermoplastic urethanes based on polyesters, polyethers, polycaprolactone and polycarbonate macrogels can be employed as well. The interior of cushioning device 48 is preferably inflated inner pressure with a gaseous fluid, for example, sulfur hexafluoride ("supergas"), air or one of the other suitable gases which are identified in the '156 or '945 patents, such as: hexafluoroethane; perfluoropropane; perfluorobutane; perfluoropentane; perfluorohexane; perfluoroheptane; octafluorocyclobutane; perfluorocyclobutane; hexafluoropropylene; tetreafluoromethane; monochloropentalfluroethane; 1,2-deichlorotetrafluroethane; 1,1,2-trichloro-1,2,2 trifluoroethane; chlorortrifluoroethylene; bromotrifluoromethabn; and monochlorotrifluoromethane. These gases may all be termed supergases. Weld lines and/or weld dots may be formed in a conventional manner in cushioning device 48. In a preferred embodiment of the present invention, cushioning device 48 is formed from a generally transparent or translucent elastomeric film to enable visibility through the inflated bladder and it is inflated with sulfur hexafluoride to provide a consistent and enduring inflation pressure. Alternatively, cushioning device 48 may be formed using conventional blow-molding techniques and weld dots and/or lines may be omitted dependent upon the configuration of the inflated bladder.

Figure 5:
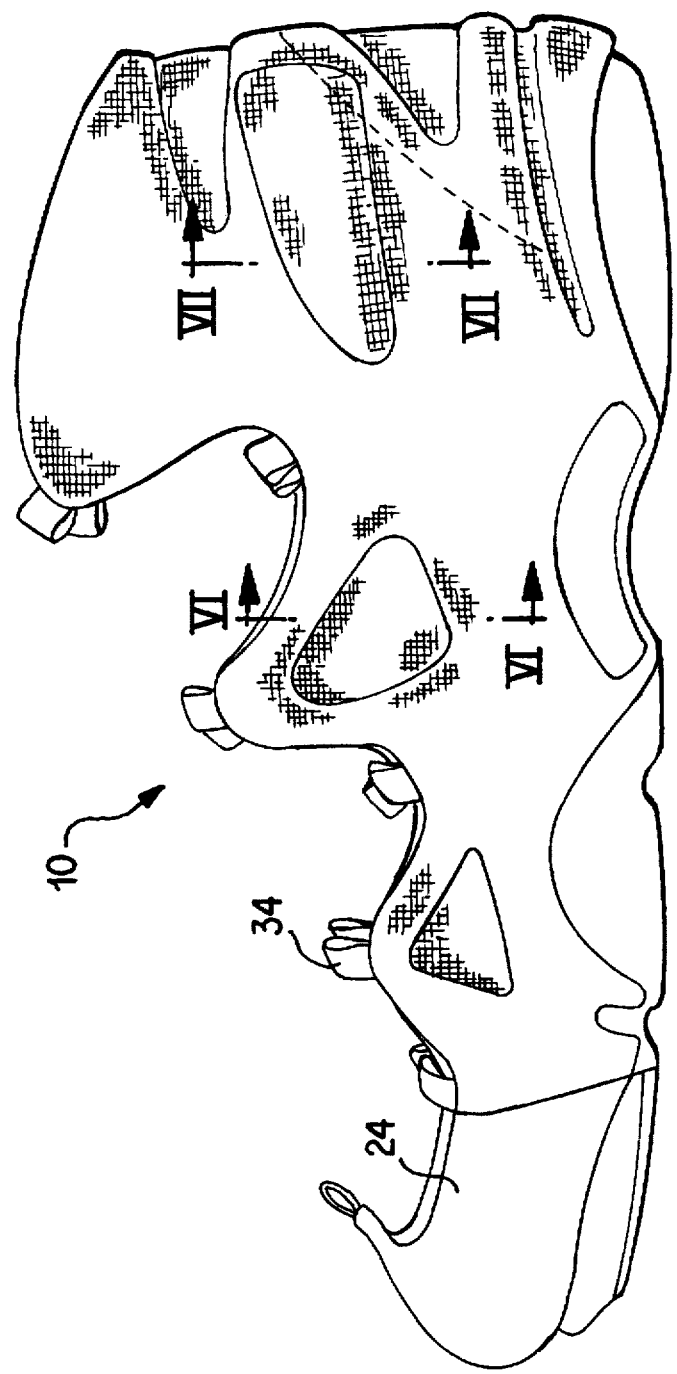
FIG. 5 is a side elevational view of the finished article of footwear shown in FIG. 3.

After removal from the mold, as shown in FIG. 8(G), any excess material not used for the molded upper is trimmed from around the upper component 22. Thereafter, as shown in FIGS. 3, and 8(H) any additional optional cushioning units 18 are stock fit and/or adhered to the bottom surface 44 of midsole 16 in the cavity 46 which is preformed in the midsole and, finally, the outsole 20 is stock fit and/or adhered to the molded upper 14 and midsole 16. Alternatively, midsole 16 and outsole 20 can be formed as a single integral sole unit, which can be attached to molded upper 14 during the molding process. Thus, as illustrated in FIGS. 5, 9 and 11 the completed article of footwear 10, 100, 200, respectively, is formed.

Figure 6:
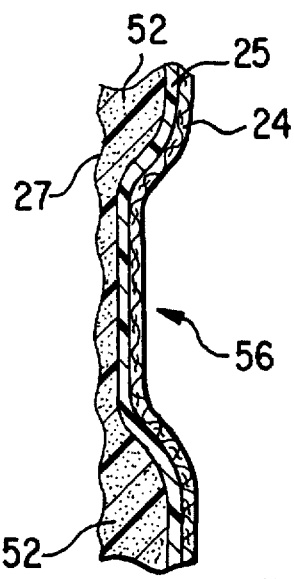
FIG. 6 is a partial cross-sectional view taken generally along the line VI—VI of FIG. 5.
Figure 7:
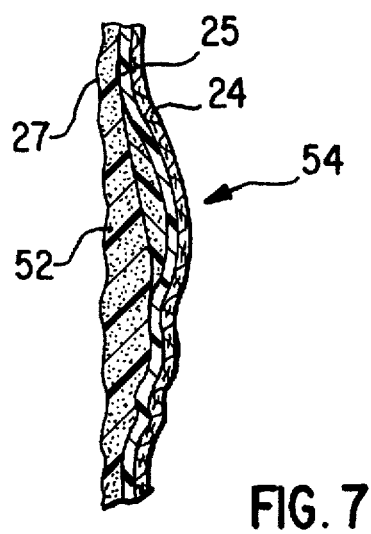
FIG. 7 is a partial cross-sectional view taken generally along the line VII—VII of FIG. 5.

Referring to FIGS. 6 and 7, in a preferred embodiment of the present invention, the upper 14 includes regions of varying thicknesses of cured foam material. This variance is created by providing local depressions or projections in either mold core 50 or mold base 36. The depressions in mold base 36 shown in FIG. 8(C) form the design elements 68 that will be formed in the final article of footwear. Depressions will allow more foam to enter the localized regions and thereby form areas 54 with an increased thickness of foam. On the other hand, projections in mold base 36 will form design elements having a thinner area in an upper, as shown in FIG. 4. Projections will force the inner material surface 26 and outer material surface 24 into a closer spaced relationship to thereby form areas 56 with a decreased thickness of foam. In fact, if inner material surface 26 and outer material surface 24 are brought into direct contact with one another, areas 56 having generally no foam thickness between the material surfaces will be formed.

An increased foam thickness is used to provide more support as well as additional padding and cushioning in localized areas such as the ankle or collar. A decreased foam thickness or even no foam thickness is used to provide greater flexibility to localized areas of the upper such as the sides of the shoe, heel counter or ankle collars. Referring to FIG. 11, the use of varying thicknesses of foam in localized areas also create decorative features 68 on the finished upper. As shown in FIG. 5, the areas 54 of increased thickness form broad bands around the heel areas while the areas 56 of virtually no foam thickness form triangular depressions in the side of the upper 14.

Figure 10:
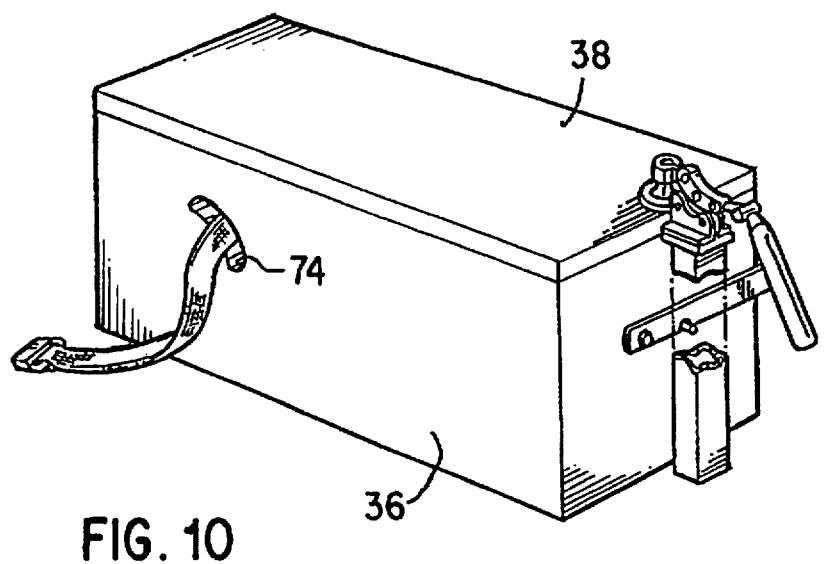
FIG. 10 is diagrammatic drawing illustrating the mold used for manufacturing the article of footwear shown in FIG. 9.

FIG. 11 illustrates an article of footwear 200 in the form of a basketball shoe, and FIG. 9 illustrates footwear 100 in the form of a sandal, both made in accordance with the process of the present invention. Shoe 200 includes an upper 14' wherein a plurality of curved lines define the design elements 68 that are formed along the side of the upper by adjoining areas of increased and decreased thickness of foam. Sandal 100 includes straps and attachment hardware secured to the material layers of the upper prior to the pouring of the foam. As shown in FIG. 10, the mold base used for the formation of sandal 100 includes an opening 74 for the strap of the sandal to pass through, and thus be out of the way, during the molding process.

Figure 12:
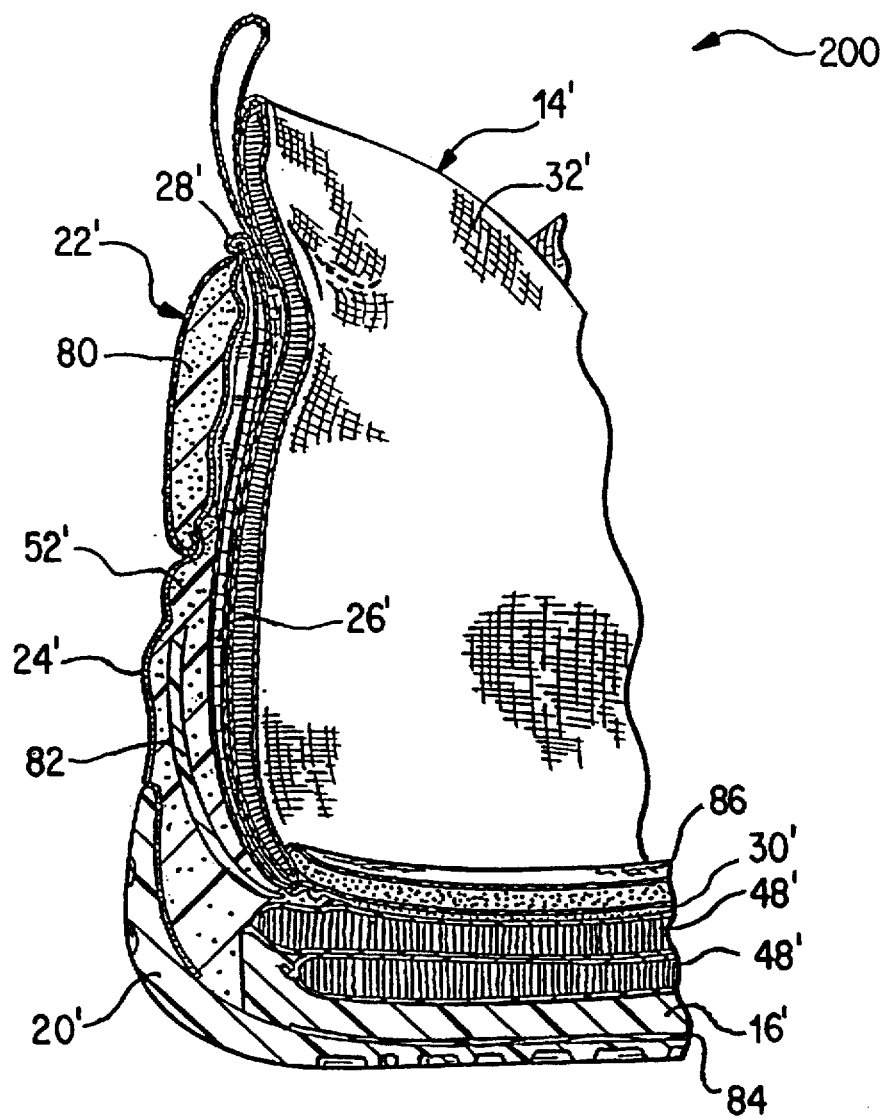
FIG. 12 is a cross-sectional view taken generally along line XII—XII of FIG. 11.

Referring to FIGS. 11 and 12, the construction of molded upper 14' for article of footwear 200, including decorative ornamentation and reinforcement, is shown in detail by the cross section through upper 14'. As illustrated in FIG. 12, the preferred upper component 22' includes an outer material 24' formed of a polyurethane coated stretch textile, such as a pearlized span polyurethane available from DAE WOO under the tradename "SPAN PU", which extends from adjacent midsole 16' upward to top edge 28'. In this instance, the outer material 24' prevents foam material from passing through the material and therefore an additional film layer is not needed between the foam and outer material 24'. An inner material 26' extends upward from the inner bottom edge of upper 14' where it is joined to a bottom surface material 30'. Inner material 26' is formed of a non-stretch textile, preferably Gold Long John #87, and bottom surface material 30' is also formed of a non-stretch textile. Inner material 26' also includes a film layer 27 (not shown) to prevent the foam material from passing therethrough. Decorative ornamentation 80 in the form of a layer material is attached to the exterior surface of outer material 24' by a conventional technique such as stitching along the top and bottom edges of decorative ornamentation 80 or by adhesive attachment. In the specific embodiment illustrated, decorative ornamentation 80 is formed of a heavy merry mesh material having an inner layer of polyurethane foam to provide the desired degree of padding. However, it should be obvious to one skilled in the art that numerous materials such as lycra, any textile, or any decorative element could also be used, as could EVA foam or any other type of padding. A supportive element in the form of a heel counter 82 is incorporated within the foam material of upper component 22'. A preferred foam material 52' in this embodiment is a polyether polyurethane having a 35 Asker C hardness, a specific gravity of 0.2 and standard blow rate, however, polyester polyurethane or any type of pourable plastic foam could also be used, as discussed further below. A preferred material for heel counter 82 is a thermoplastic material with a thickness of approximately 3.0 mm, such as "Surlyn" for example.

Inner bootie 32', which is preferably formed of Guilford mesh material lined with stretch lycra, is also stitched along the bottom of upper component 22' along with bottom surface material 30' and inner material 26'. As discussed above, inner material 26', outer material 24', bottom surface material 30', inner bootie 32' and decorative material 80 are all placed over mold core 50 and placed within mold base 36. Heel counter 82 is then preferably fitted within the contours of the mold base prior to the foam being poured. Alternatively, the heel counter may be temporarily positioned by adhesive, tape, or the like. Midsole 16', including a pair of air bladders 48', are placed on top of the mold. Foam material 52' in a viscous or liquid state at a temperature of approximately 80°–55° C. is poured into the cavity between the inner and outer materials 26', 24', respectively. A predetermined amount of foam material is poured into the cavity, for example 50–200 grams for a size 9 shoe, depending on the design details of the mold, the desired hardness of the foam and other foam parameters such as blow rate and specific gravity. The mold top is closed and clamped shut for approximately three to eight minutes while foam material 52' sets and bonds to inner and outer materials 26', 24', heel counter 82 and midsole 16' including air bladders 48'. Air bladders 48' are preferably tensile type air bladders of the type disclosed in U.S. Pat. Nos. 4,936,029 and 5,083,361, the entire contents of which are hereby incorporated by reference.

After upper component 22' is molded, as described above, and removed from the mold, any excess material not used for the molded upper is trimmed from around the upper component 22'. Thereafter, a graphite composite plate 84 is adhered or otherwise fixedly secured to the bottom surface 44' of midsole 16' and, finally, the outsole 20' is stock fit and/or adhered to the molded upper 14' and midsole 16'. A removable insole 86 may also be disposed within the interior of the molded upper 14'.

It can be readily understood that a variety of alternate or equivalent methods, processes and manufacturing techniques could be used to derive the article of footwear of the present invention. It will also be obvious to those of ordinary skill in the art that numerous modifications may be made without departing from the true spirit and scope of the present invention, which is to be limited only by the appended claims.

We claim:

1. A method of making an article of footwear, said method comprising the steps of:
   constructing an upper component for an article of footwear to define an upper formation cavity between an inner surface material and an outer surface material of the upper component;
   disposing the upper component on a mold core;
   positioning the mold core and the upper component in a base portion of a mold such that the upper formation cavity is accessible from above when the mold is open;
   pouring a plastic foam material into the upper formation cavity of the upper component;
   closing a top portion of the mold onto the base portion of the mold to thereby sealingly close the mold and the upper formation cavity;
   forming a molded article of footwear upper by curing the plastic foam material within the upper formation cavity of the upper component; and
   opening the top portion of the mold and removing the article of footwear upper.

2. The method of claim 1 further comprising, prior to said step of closing the top portion of the mold, positioning a preformed sole unit over the mold core and the upper component.

3. The method of claim 2 wherein said curing step includes integrally joining the preformed sole unit with the molded article of footwear upper and wherein said removing step includes removing the molded article of footwear sole unit and upper from the mold.

4. The method of claim 3 wherein said positioning step includes positioning a midsole unit as the sole unit.

5. The method of claim 3 further comprising, after removing the article of footwear upper and sole unit from the mold, trimming any excess material from the inner and outer surfaces of the molded article of footwear upper.

6. The method of claim 3 further comprising, after removing the article of footwear upper and sole unit from the mold, bonding a cushioning unit to a bottom surface of the preformed sole unit.

7. The method of claim 4 further comprising, after removing the article of footwear upper and midsole unit from the mold, bonding an outsole portion to a bottom surface of the preformed midsole unit.

8. The method of claim 1 wherein said step of constructing the upper component includes finishing the upper with additional elements.

9. The method of claim 8 wherein said finishing step includes overlapping at least one layer of material and at least one support member.

10. The method of claim 8 wherein said finishing step includes providing the upper component with a closure system for the molded article of footwear.

11. The method of claim 10 wherein said step of providing a closure system includes forming lace apertures in the upper component.

12. The method of claim 10 wherein said step of providing a closure system includes attaching lace loops to the upper component.

13. The method of claim 1 wherein said step of forming the molded article of footwear upper includes forming regions with varied thicknesses of cured plastic foam material by having depressions formed in one of the mold core and the base portion of the mold.

14. The method of claim 1 wherein said step of forming the molded article of footwear upper includes forming regions without cured plastic foam by having the mold core and the base portion of the mold press the inner and outer surface materials against one another at selected regions.

15. A method of making an article of footwear, said method comprising the steps of:
   constructing an upper component for an article of footwear to define an upper formation cavity between an inner surface material and an outer surface material of the upper component, the upper component having an inner surface and an outer surface;
   finishing the outer surface of the upper component with at least one decorative element;
   providing the upper component with a closure system for the molded article of footwear;
   disposing the upper component on a mold core;
   positioning the mold core and the upper component including said at least one decorative element and said closure system in a base portion of a mold such that the upper formation cavity is accessible from above when the mold is open;
   pouring a plastic foam material into the upper formation cavity of the upper component;
   closing a top portion of the mold onto the base portion of the mold to thereby sealingly close the mold and the upper formation cavity;

molding the upper component including said at least one decorative element and said closure system to form a molded article of footwear upper and curing the foam material;

opening the top portion of the mold; and removing the completed article of footwear upper having integrally molded decorative ornamentation and closure system.

16. The method of claim 15 wherein said finishing step includes stitching a plurality of overlapping layers of material on the outer surface of the upper component.

17. The method of claim 15 wherein said finishing step includes overlapping at least one layer of material and at least one support member.

18. The method of claim 17 wherein said step of providing a closure system includes forming lace apertures in the upper component.

19. The method of claim 15 wherein said step of providing a closure system includes attaching lace loops to the upper component.

* * * * *